United States Patent [19]
Graef et al.

[11] Patent Number: 5,474,849
[45] Date of Patent: Dec. 12, 1995

[54] ADHESIVE COMPOSITION, CARBON-CARBON COMPOSITE STRUCTURES PREPARED THEREWITH, AND METHOD OF FORMING SAME

[75] Inventors: Renee C. Graef, San Antonio, Tex.; David G. Paquette, Fullerton, Calif.; Stuart T. Schwab, San Antonio, Tex.

[73] Assignee: Southwest Research Institute, San Antonio, Tex.

[21] Appl. No.: 420,755

[22] Filed: Apr. 12, 1995

Related U.S. Application Data

[60] Division of Ser. No. 212,020, Mar. 11, 1994, which is a continuation-in-part of Ser. No. 764,793, Sep. 24, 1991, Pat. No. 5,294,425.

[51] Int. Cl.[6] ..................................................... B32B 9/04
[52] U.S. Cl. .......................... 428/408; 428/446; 428/698; 428/325; 427/376.2
[58] Field of Search ................................. 428/408, 446, 428/698; 427/376.2; 524/496

[56] References Cited

U.S. PATENT DOCUMENTS

| | | | |
|---|---|---|---|
| 5,173,367 | 12/1992 | Liimatta et al. | 428/408 |
| 5,194,338 | 3/1993 | Niebylski | 428/446 |
| 5,258,224 | 11/1993 | Langlois, Jr. et al. | 428/408 |
| 5,258,229 | 11/1993 | Lum et al. | 428/408 |

*Primary Examiner*—Tae H. Yoon
*Attorney, Agent, or Firm*—John L. Sigalos

[57] ABSTRACT

An adhesive composition for joining carbon-carbon composites comprising a polymeric thermosetting polysilazane, a ceramic powder, silicon powder, and carbon powder. The invention also comprises the method of making carbon-carbon composite structures utilizing such adhesive composition and to the resultant products.

8 Claims, 1 Drawing Sheet

5,474,849

ADHESIVE COMPOSITION, CARBON-CARBON COMPOSITE STRUCTURES PREPARED THEREWITH, AND METHOD OF FORMING SAME

This application is a division of application Ser. No. 08/212,020 filed Mar. 11, 1994 now pending, which is a continuation-in-part of U.S. patent application Ser. No. 07/764,793, filed Sep. 24, 1991, now U.S. Pat. No. 5,294,425.

BACKGROUND OF THE INVENTION

The present invention relates to an adhesive composition suitable for use in joining carbon-carbon composites, to the thus-joined composites themselves, and to the method of forming the same. The invention is based, in part, on the utilization of polymeric ceramic precursors disclosed in the parent application identified above, whose entire specification and claims are specifically incorporated herein by reference.

Carbon-carbon composites are widely utilized in the aerospace industry because of their high strength-to-weight ratio, their high degree of stiffness, and stability against dimensional variation. Moreover, these composites also have a high level of chemical and thermal stability. One of the difficulties, however, is joining these composites together to form variously shaped structures, as for example satellite and space orbit structures. At the present time carbonaceous bonds and mechanical means have been utilized to join the composites but they have not been found satisfactory. Such joining techniques lack the stability of the composites themselves. The carbonaceous bonds are too weak and mechanical joints tend to lack stiffness and can suffer from vibration fatigue problems near the fastening means used for such mechanical joints. Neither one of these methods of joining carbon-carbon composites to form larger structures result in structures which have all the same thermal stability and strength characteristics of the carbon-carbon composites themselves. A satisfactory joining method has thus far not been found.

SUMMARY OF THE INVENTION

The present invention overcomes the problems of the prior art to provide carbon-carbon composite structures in which the bond between the individual composites will have thermal and chemical stability and below temperature characteristics of the composites themselves.

Briefly stated, the present invention comprises an adhesive composition for joining carbon-carbon composites comprising a polymeric ceramic precursor, and for each 100 parts by weight thereof 20 to 50 parts by weight of a ceramic powder, 10 to 40 parts by weight silicon powder and 5 to 15 parts by weight carbon powder.

The instant invention also comprises the resultant carbon-carbon composite structures and the method of forming the same as hereinafter more fully set forth.

DETAILED DESCRIPTION

Figure 1:
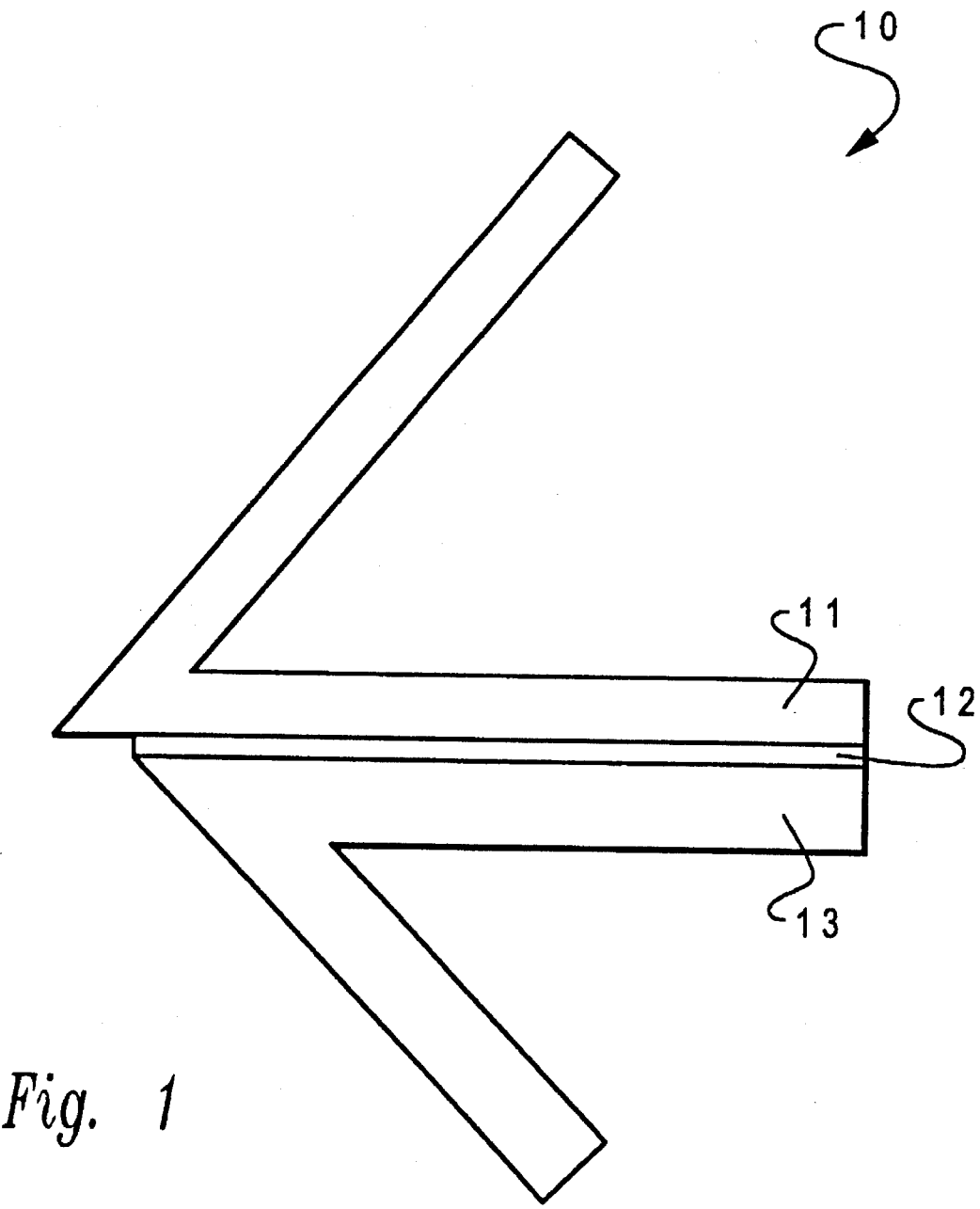
FIG. 1 is a sectional view of a carbon-carbon composite structure of the present invention.

While the present invention is directed to adhesives suitable for forming carbon-carbon composite structures, the individual carbon-carbon composite themselves are conventional and can be formed by any conventional and known method. Carbon-carbon composites are formed of carbon fibers, typically woven into two-dimensional weaves which are stacked and surrounded by a dense carbon matrix. Carbon-carbon composites can be flat or shaped into three-dimensional structures.

The instant invention is directed to adhering the various conventionally formed carbon-carbon composites together to form larger structures, particularly where the joining technique itself must meet all of the same thermal stability and strength requirements of the carbon-carbon composite itself.

The adhesive composition utilized in forming the composites of the instant invention requires the use of a polymeric ceramic precursor, preferably a fluid thermosetting one, and more particularly the thermosetting polysilazanes such as those disclosed in the parent application identified above. Most suitable is perhydropolysilazanes which can be thermally transformed into silicon nitride. Other specific examples are N-tert-butyl hydridopolysilazane and N-n-butyl hydridopolysilazane. The method of forming these preceramic precursor polymers is not a part of the invention and with respect to the polysilazanes is disclosed in the parent application discussed above.

As to the ceramic powder utilized, it is preferred to use a silicon carbide or silicon nitride and preferably one having a micron size no greater than about 10 microns and preferably an average particle size of about 0.5 micron.

With respect to the silicon powder it is preferred to use a silicon powder with an average particle size of about −325 mesh (Tyler). The carbon powder can be activated charcoal, graphite, and the like and the preferred average particle size is about −325 mesh (Tyler).

It is preferred that the purity of all the powders discussed above be 99% or greater.

The adhesive is formed by simply thoroughly mixing the components described above to form a substantially homogeneous mixture using conventional inert atmosphere/vacuum manifold procedures.

To form the structures from the individual carbon-carbon composites, the adhesive described above is applied to at least one of the surfaces of the carbon-carbon composites that are to be joined. The composites are forced together to expel any excess adhesive, which is removed, and the assembly then cured and fired. It is preferred to hold the assembly in a vacuum bag during curing or if the assembly is too large or complex to use clamps or other conventional tools to hold the individual composites in contact until curing and firing are completed. It is preferred to effect curing at about 200° C. in an autoclave under a moderate overpressure of an inert gas, such as nitrogen.

After cure, the assembly or structure is removed from the vacuum bag or mechanical means used to hold the assembly together during curing and firing. The firing is at a temperature and for a time sufficient to convert the polymeric ceramic precursor, used as part of the adhesive, to a ceramic. The optimum temperature and time for each adhesive will, thus, vary, but can be determined by routine experimentation. For perhydropolysilazane, for example, a temperature of about 1450° C. for about 30 minutes is suitable. It is preferred to carry out the firing under a flowing inert gas, such as nitrogen, and any conventional furnace can be used.

Referring to FIG. 1, it shows structure 10 consisting of carbon-carbon composite 11 joined to carbon-carbon composite 13 by ceramic 12, which ceramic 12 was originally an adhesive composition comprising a polymeric ceramic precursor.

Investigations into the nature of the bond have not yielded a definitive answer as to the nature of the bond; however, some reasonable theories have been formed. SEM evaluation of cross-sectional view of the bonded material has shown evidence of silicon nitride penetrating three and four plies of the carbon-carbon composites. This would suggest that the polymer can create mechanical holds in the composite by penetrating the small pores of the carbon surface as a liquid polymer and then converting to a rigid ceramic.

The primary means of adhesion is believed to be a result of chemical bonding that occurs between the polymer and silicon components of the adhesive and the carbon of the composite. The polymer has active Si—H sites that probably bond with the carbon to form Si—C. In a similar manner, when the part is heated above 1410° C. (the melting point of silicon) the silicon melts and flows into contact with the carbon forming Si—C bonds. Evidence of this bonding has been seen on the surface of a broken bond as thin layers of the carbon-carbon composite are torn away from the composite to remain with the adhesive.

Addition of a small amount of carbon powder was necessary to obtain adhesive strengths high enough for dual notched beam shear testing. Other experiments evaluating similar mixtures excluding the carbon produced inferior results. Perhaps the carbon allows the Si—C bond to extend continuously from one carbon surface of one carbon-carbon composite to the mating surface of the other composite.

The invention will be further described in connection with the following example which is set forth for purposes of further illustration only.

EXAMPLE

A perhydropolysilazane prepared in accordance with Example 3 of the parent application was loaded with 30 wt. % silicon powder, 30 wt. % silicon nitride powder, and 5 wt. % activated charcoal. The resulting material was a paste which was applied by spatula to each face of two planar carbon-carbon composite parts to be joined. The joined surfaces were parallel to the laminates of the carbon-carbon composite parts.

The carbon-carbon composite material was Carbon-Carbon Advanced Technologies CC-1. The parts were manually squeezed together to expel excess bonding material and then placed in a vacuum bag for autoclave curing. During the cure cycle, 50 pounds of overpressure was applied to the bag as it was heated to 260° C. at 1.67° per minute. The assembly was then removed from the vacuum bag and transferred to a tube furnace where it was heated to 1450° C. and held under flowing nitrogen for 30 minutes.

Mechanical testing was performed according to the dual notched beam shear test generally described in ASTM D3846-79. The bonded assembly had a strength of 680 psi. averaged over 5 specimens, which is about 55% of the interlaminar shear strength of the carbon-carbon composite material itself. Microanalysis of the bond showed that the bond was filled uniformly with typical crack and void dimensions of 10 microns, very small compared to the thickness of the bond. Extensive fiber pullouts on the fractured bond surfaces showed good bonding to the fibers in the carbon-carbon composite material.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A carbon-carbon composite structure comprising at least two shaped carbon-carbon composites having at least a portion of a surface of each composite joined together with an adhesive comprising a polymeric thermosetting polysilazane, and for each 100 parts by weight thereof, 20 to 50 parts by weight of a ceramic powder, 10 to 40 parts by weight of silicon powder, and 5 to 15 parts by weight of carbon powder, which adhesive has been cured and fired to convert said polysilazane to a ceramic.

2. The structure of claim 1, wherein said polysilazane is perhydropolysilazane.

3. The structure of claim 2, wherein the carbon is activated charcoal.

4. The structure of claim 3, wherein the ceramic powder is silicon carbide, silicon nitride or a mixture thereof.

5. A method of forming a carbon-carbon composite structure comprising applying a curable adhesive layer onto at least a portion of a surface of a first shaped carbon-carbon composite, said adhesive comprising a polymeric thermosetting polysilazane, and for each 100 parts by weight thereof, 20 to 50 parts by weight of a ceramic powder, 10 to 40 parts by weight of silicon powder, and 5 to 15 parts by weight of carbon powder, placing at least a portion of a surface of at least one other shaped carbon-carbon composite in contact with said adhesive layer on said first shaped carbon-carbon composite to form said structure, curing said adhesive while maintaining said first and at least one other shaped carbon-carbon composite in contact, and then firing said structure at a temperature and for a time sufficient to convert said polysilazane to a ceramic.

6. The method of claim 5, wherein said polysilazane is perhydropolysilazane.

7. The method of claim 6, wherein the carbon is activated charcoal.

8. The method of claim 7, wherein the ceramic powder is silicon carbide, silicon nitride or a mixture thereof.

* * * * *